(12) United States Patent
Winn

(10) Patent No.: US 6,901,424 B1
(45) Date of Patent: May 31, 2005

(54) SYSTEM AND METHOD FOR CREATING A SAMPLE POOL FOR A WEB-BASED SURVEY

(75) Inventor: Marcus Winn, San Francisco, CA (US)

(73) Assignee: Markettools, Inc., Mill Valley, CA (US)

( * ) Notice: Subject to any disclaimer, the term of this patent is extended or adjusted under 35 U.S.C. 154(b) by 692 days.

(21) Appl. No.: 09/686,313

(22) Filed: Oct. 10, 2000

(51) Int. Cl.[7] .............................................. G06F 15/16
(52) U.S. Cl. ...................................... 709/201; 709/225
(58) Field of Search ................................ 709/225, 201, 709/206, 217, 204, 205, 200; 705/26, 10, 14; 707/102, 104.1

(56) References Cited

U.S. PATENT DOCUMENTS

| | | | |
|---|---|---|---|
| 6,070,145 A | * | 5/2000 | Pinsley et al. ................ 705/10 |
| 6,175,833 B1 | * | 1/2001 | West et al. .................. 707/102 |
| 6,189,029 B1 | * | 2/2001 | Fuerst ......................... 709/217 |
| 6,311,190 B1 | * | 10/2001 | Bayer et al. .............. 707/104.1 |
| 6,457,045 B1 | * | 9/2002 | Hanson et al. .............. 709/206 |
| 6,477,504 B1 | * | 11/2002 | Hamlin et al. ................ 705/10 |

OTHER PUBLICATIONS

Palladino, M, "A Step by Step Guide to Building a Web-Based Survey—Writing HTML Code and ASP Scripts", Drexel University, 1999.*

* cited by examiner

*Primary Examiner*—Marc D. Thompson
(74) *Attorney, Agent, or Firm*—Brian L. Johnson; Davis Wright Tremaine LLP

(57) ABSTRACT

A system and method for creating a sample pool for a web-based survey including at least one host machine for serving an HTML document, a survey manager machine connected to each of the host machines, and a least one executable tag embeddable in the HTML document, the executable tag being operable to communicate with a process running on the survey manager machine to create the sample pool when a user accesses the HTML document.

18 Claims, 5 Drawing Sheets

SYSTEM AND METHOD FOR CREATING A SAMPLE POOL FOR A WEB-BASED SURVEY

BACKGROUND OF THE INVENTION

1. Field of the Invention

The present disclosure relates generally to conducting market research an surveys in real-time over the Internet, and more particularly to creating a sample pool for a web-based survey.

2. Description of the Prior Art

One problem faced by those involved in conducting surveys is the identification and creation of a survey sample pool composed of individuals willing to respond to the survey. Visitors to Internet websites provide a rich pool of potential survey respondents and are particularly appropriate for Internet-based surveys. Internet users of every imaginable description routinely navigate from website to website providing a diverse potential sample pool for survey projects.

One commonly used technique for the solicitation of website visitors is to "intercept" visitors by displaying a pop-up window in a visited website. For the purpose of soliciting survey respondents, the pop-up window generally contains an invitation to take a survey and a hyperlink to an intercepting website providing the survey. While this technique is useful in diverting users from the visited website to the intercepting website, the technique requires that the webmaster of the visited website insert HTML and/or Javascript code into the code of the visited website to generate the pop-up window. The inserted code must when be changed or deleted as survey projects are initiated, modified and finalized.

The conventional technique further requires that actions such as initiating a flow of survey respondents from the visited website to the intercepting site, changing the sampling rate at which respondents are solicited, and terminating the flow of survey respondents once a survey quota is met, be carried out through the intervention of the webmaster of the visited website. As a number of visited websites are typically utilized for the purpose of creating a survey sample pool, these actions are necessarily resource-intensive and demanding of both the entity administering the survey and the administrators of the visited websites.

The conventional technique solicits the participation of every visitor to the visited website, making no distinction between those visitors who have already taken the survey, those that have not taken the survey, and those who have declined to take the survey. This feature unnecessarily reduces the appeal of the visited website to its users.

The disclosed system and method overcome these limitations of the prior art by providing a system and method that minimizes the effort required of a webmaster of a visited website participating in the generation of a survey sample pool. The system and method further provide all of the functionality necessary to enable an entity conducting a survey to control survey parameters. Additionally, the system and method provide for screening and selection of potential members of the survey sample pool based on user profiles.

SUMMARY OF THE INVENTION

The present invention provides a system and method for creating a sample pool for a web-based survey. The system includes a plurality of host websites connected to a survey manager website by such means as a communications network. A line of executable code, or tag, which references a survey manager website is embedded in the code of each host website. The tag is syntactically identical for each host website. To participate in the selection of a survey sample pool, webmasters or web site operators of host websites copy and embed the tag into the program code of a selected HTML document of the host website.

A user's accessing the HTML document of the host website executes the tag. The executed tag is operable to communicate to the survey manager site that a user has accessed the HTML document. The survey manager is operable to run a sampling routine that invites a percentage of qualified users to participate in a survey. As the sampling routine is distributed from a central point, changes in the sampling routine are also effected centrally. Such changes advantageously take effect immediately across all of the host websites and do not require the intervention of host website webmasters.

The system and method further provide functionality to enable the entity conducting the survey to evaluate user profiles to determine which users to solicit for participation in the survey.

Aspects of the invention include a computer-controlled method for creating a sample pool for a web-based survey. Another aspect of the invention includes a system having a central processing unit, a memory, a communications network interface, and a display device and configured to effect the same function of the method described above. Yet another aspect includes a computer program stored on a computer readable medium for causing a computer to effect the method as described above.

The foregoing and many other objects and advantages of the disclosed system and method will no doubt become obvious to those of ordinary skill in the art after having read the following detailed description of the preferred embodiments that are illustrated in the various drawing figures.

DETAILED DESCRIPTION OF THE INVENTION

Figure 1:
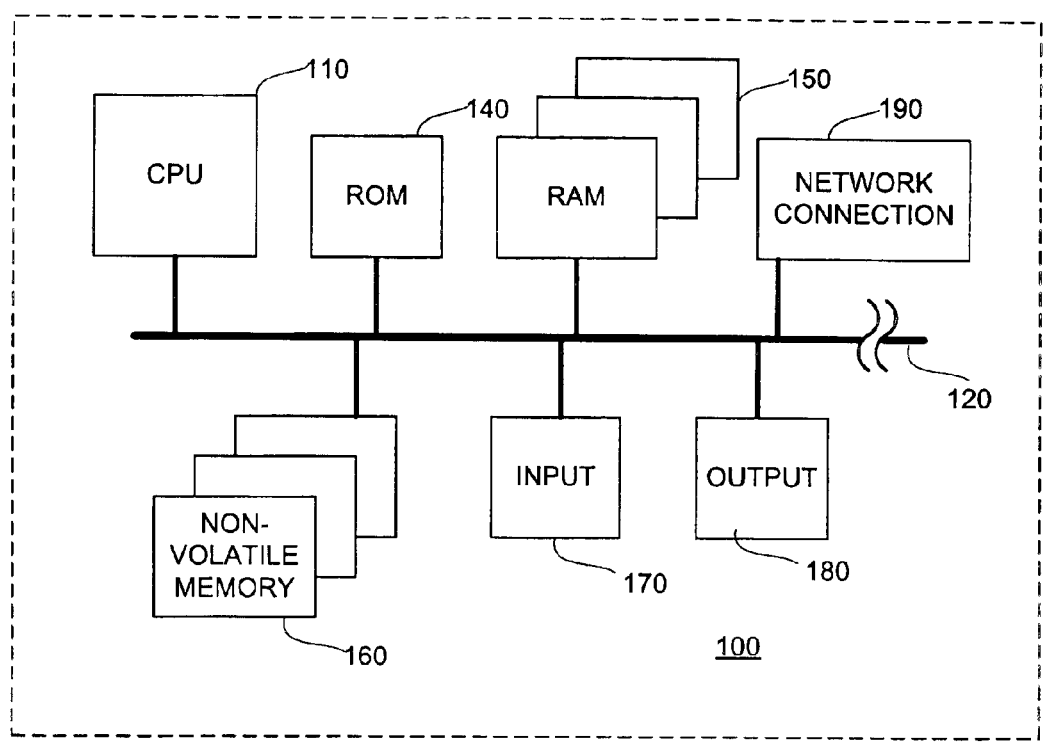
FIG. 1 illustrates a portion of a conventional computer system, including a CPU and a memory, in which the present invention may be em bodied.

A preferred embodiment of the invention is preferably practiced in the context of a personal computer such as an IBM compatible personal computer, an Apple Macintosh computer or a UNIX-based workstation. A representative hardware environment is illustrated in FIG. 1, which shows a typical hardware configuration of a workstation 100 including a central processing unit (CPU) 110, such as a microprocessor, and a number of other units interconnected via a system bus 120. The workstation includes Read Only Memory (ROM) 140, Random Access Memory (RAM) 150, and Non-Volatile Memory 160, input devices 170 (such as keyboard, mouse, microphone, and touch screen) and output devices 180 (such as display screen, printer, and speaker) coupled to the system bus 120. A Network Connection 190 connects the workstation 100 to a communication network such as an intranet or the Internet. The workstation 100 typically operates under the control of an operating system such as Microsoft Windows NT or Windows/98 OS, IBM OS/2, MAC OS, or UNIX operating system. Those skilled in the art will appreciate that the disclosed system and method can also be implemented on platforms and operating systems other than those mentioned.

Figure 2:
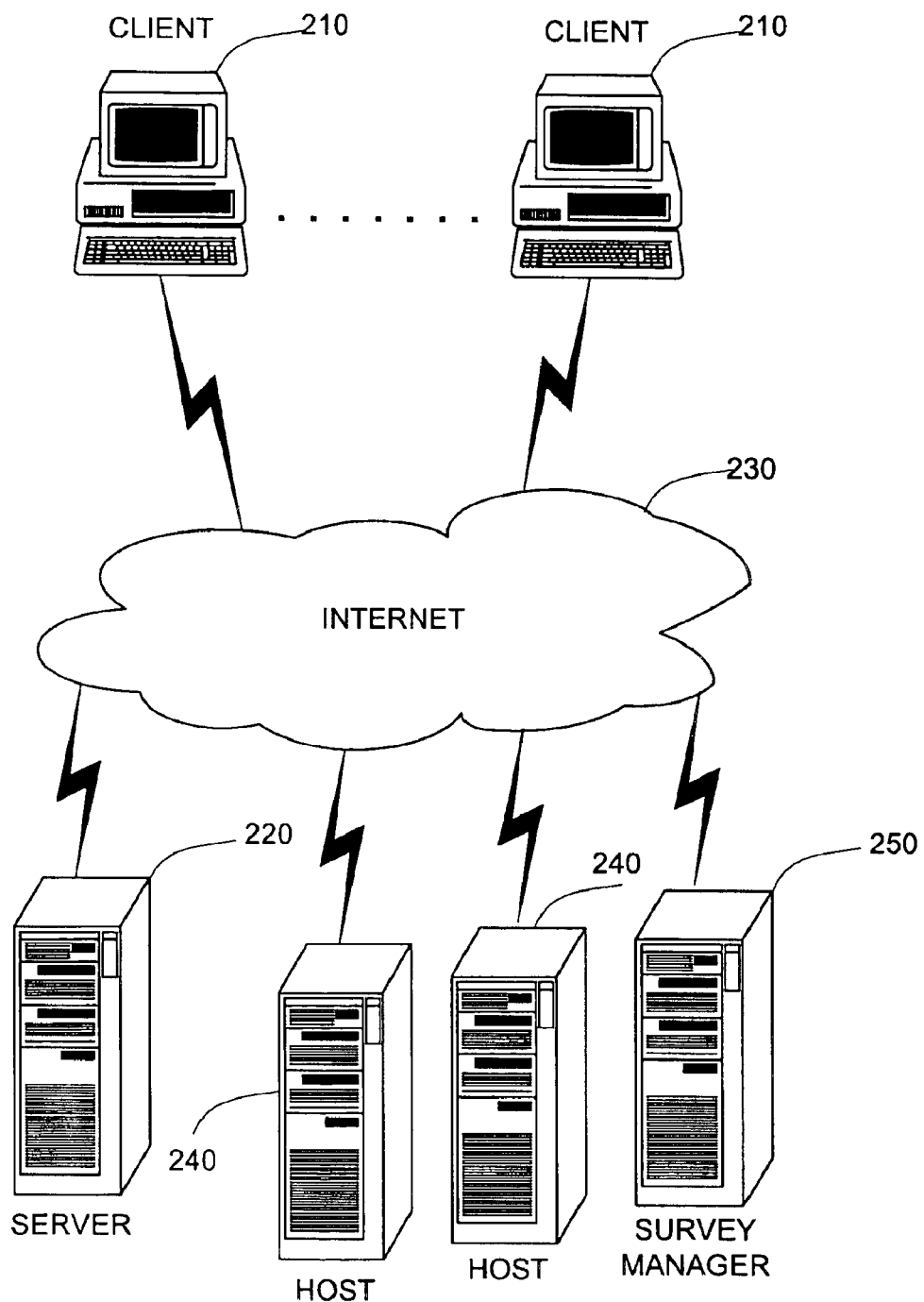
FIG. 2 illustrates a conventional client/server architecture in which the invention may be practiced.

A typical client/server system architecture is illustrated in FIG. 2 and includes a plurality of client machines 210 such as the previously described workstation 100 and at least one server machine 220. The client machines 210 and the server machine 220 are connected to a network 230 which may include an intranet or the Internet. In response to requests for information from an application running on a client machine 210, the server machine 220 serves the requested information to the application. The requested information may include data files, graphical image files and, in the case of the Internet, HTML documents which typically include hyperlinks to other documents served by different server machines on the Internet. In this manner the client/server architecture enables the sharing and distribution of vast amounts of information by and to individual client machines.

The disclosed system and method is preferably implemented in a client/server computer system. In the context of the present disclosure, users running client machines 210 access HTML documents served by server machines 220. The server machines include a plurality of host machines 240 and a survey manager machine 250.

Figure 3A:
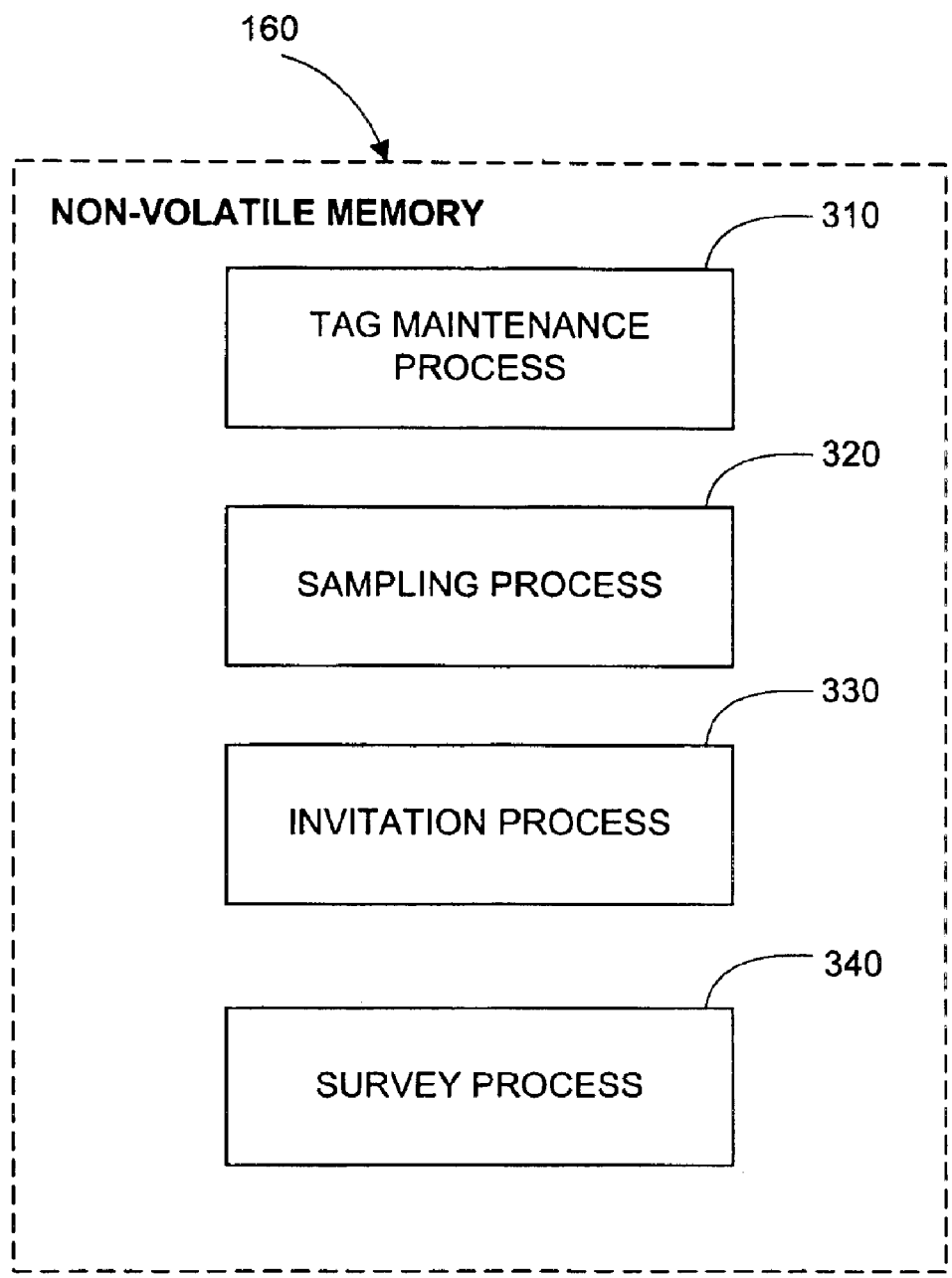
FIGS. 3a and 3b illustrate elements in accordance with a preferred embodiment of the invention.
Figure 3B:
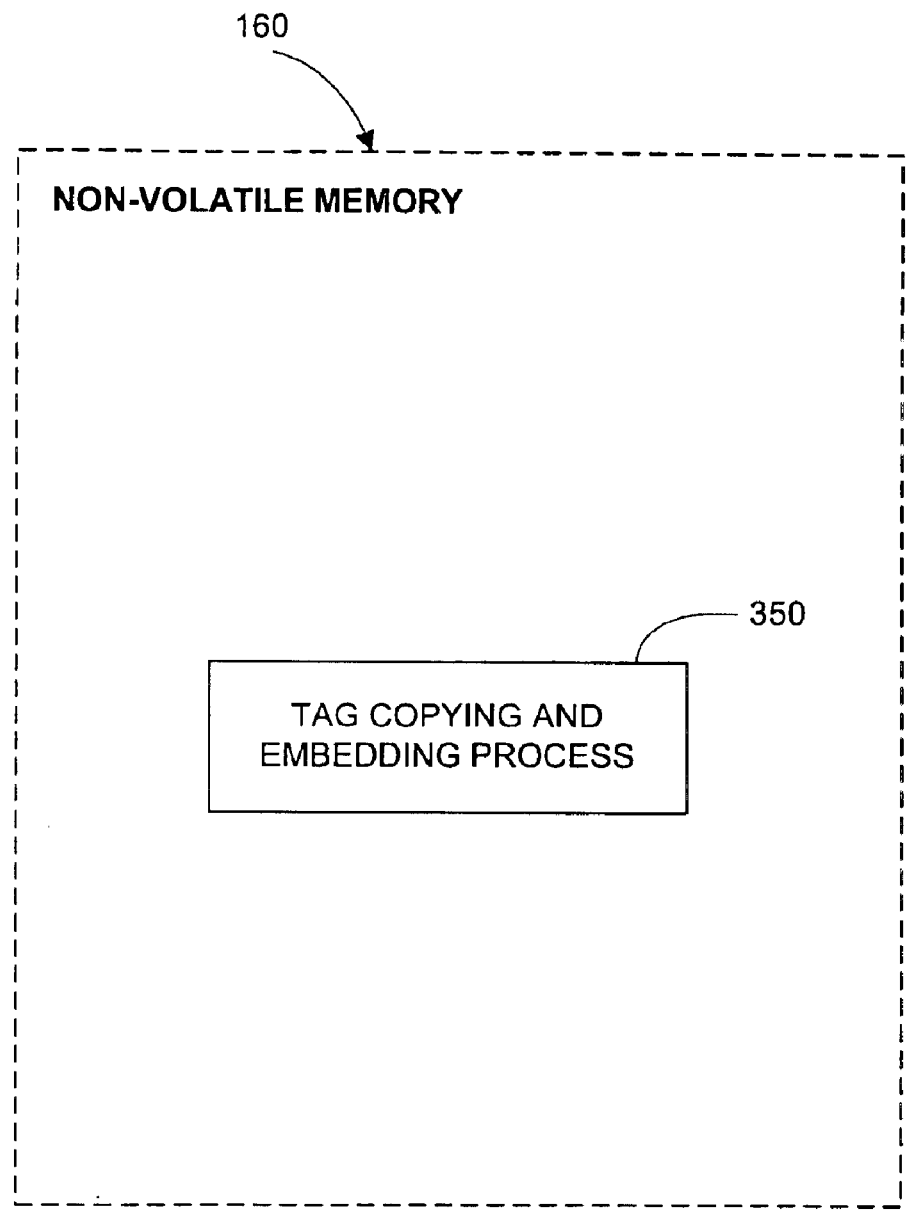

Referring to FIG. 3a, a system for creating a sample pool for a web-based survey in a first preferred embodiment, includes a tag maintenance process 310, a sampling process 320, an invitation process 330, and a survey process 340. Processes 310, 320, 330, and 340 are preferably implemented in software and reside in the non-volatile memory 160 of the survey manager machine 250. As illustrated in FIG. 3b, host machines 240 include a tag copying and embedding process 350 which is preferably implemented in software and resident in the non-volatile memory 160 of each host machine 240.

The tag maintenance process 310 includes a routine for generating a code segment or executable tag which is made available to the copying and embedding process 350. The tag embedded in each host machine 240 is syntactically identical but may differ in parameterization to identify the host machine 240 or the survey project with which each host machine 240 is associated. The tag maintenance process 310 is operable to provide to the copying and embedding process 350 of each host machine 240 a tag appropriate to the needs of the entity conducting the survey.

The copying and embedding process 350 of each host machine 240 is operable to communicate with the survey manager machine 250 and to retrieve and embed the tag in an HTML document served by the host machine 240. When a user accesses the HTML document including the embedded tag, the tag executes and is operable to communicatively link the host machine 240 to the survey manager machine 250. The tag is further operable to instruct the survey manager machine 250 to execute the sampling process 320. The sampling process 320 is accessible to the entity conducting the survey and is operable to implement a sampling rate and to qualify the user. The sampling rate preferably includes at least a predetermined frequency and a frequency determined by a random number selection process.

The invitation process 330 includes functionality to receive user profile data and to extend an invitation to a qualified user to participate in the sample pool based upon the received data. In another aspect, the invitation process 330 is operable to extend an invitation to a qualified user based upon the sampling rate determined by the sampling process 320.

Qualified users receiving an invitation to participate in the sample pool can optionally choose to or not to participate in the survey. In the event a qualified user accepts the invitation to participate, the survey process 340 is called to administer the appropriate survey to the qualified user. By providing for a qualification process implemented by the sampling process 320 and the invitation process 330, the disclosed system does not solicit every user accessing the HTML document having th embedded tag. Furthermore, an unsolicited user is not aware of the sampling process 320 or the invitation process 330.

The invitation process 330 further includes functionality to track which users have been solicited to participate in a sample pool. Thus the disclosed system functions to solicit users only once. In one aspect, this functionality is embodied in the use of "cookies". When the invitation process 330 extends an invitation to a user, a cookie is written to the memory of the user's machine. When the user subsequently accesses the HTML document having the embedded tag, the cookie is read by the sampling process 320 and the invitation process 330 is precluded from extending another invitation to the user for the same survey project.

Figure 4:
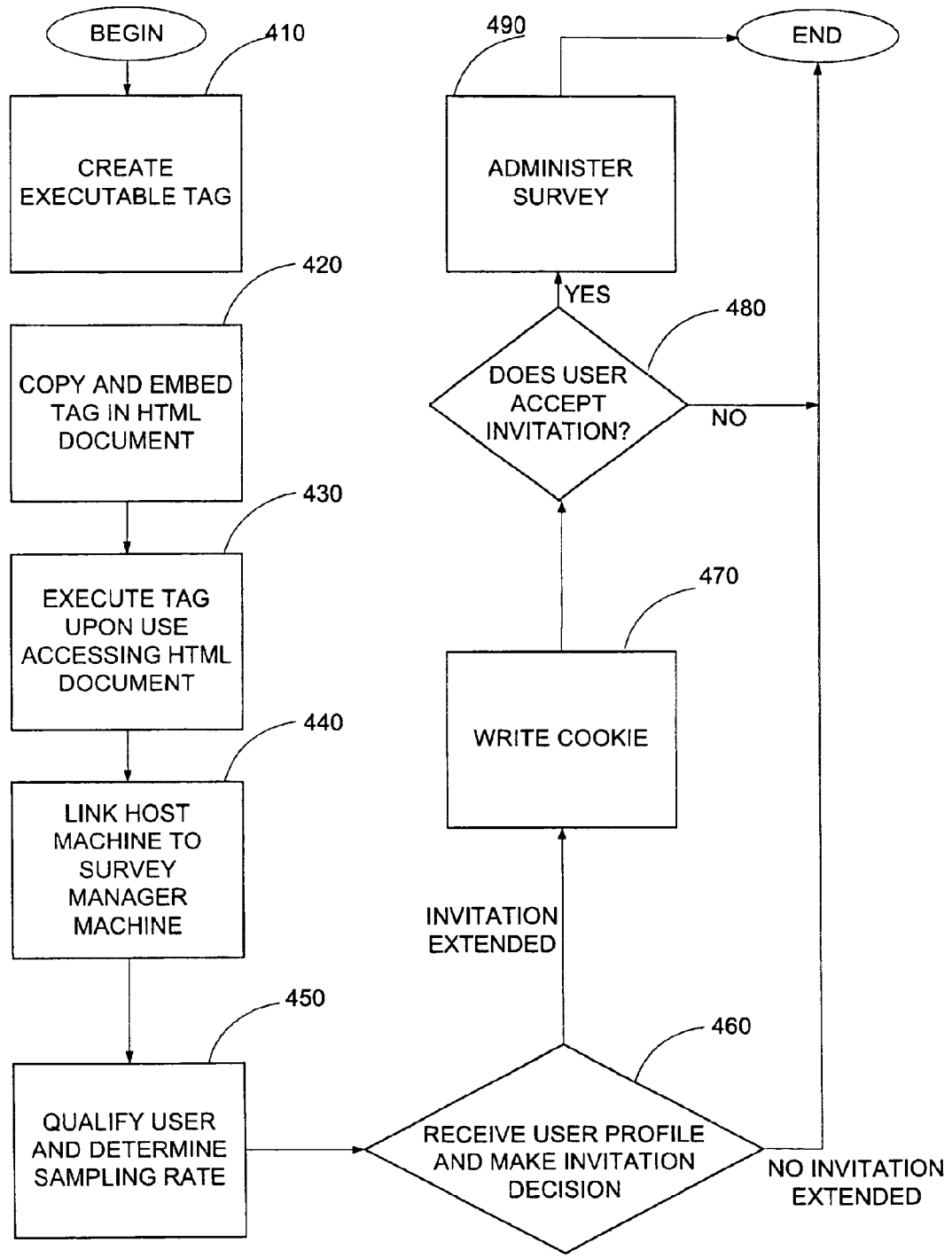
FIG. 4 illustrates the overall process for creating a sample pool in accordance with a preferred embodiment.

FIG. 4 illustrates another preferred embodiment of a method for creating a sample pool for a web-based survey, which includes a step 410 of creating a code segment or executable tag in a survey manager machine 250. In a step 420, the tag is copied and embedded in an HTML document served by a host machine 240. The tag is executed upon a user accessing the HTML document including the embedded tag in a step 430. The executed tag communicatively links the host machine 240 to the survey manager machine 250 in a step 440.

In a step 450, a sampling process 320 qualifies the user to participate in a survey sample pool and determines a sampling rate including at least a predetermined frequency and a frequency determined by a random number selection process. An invitation process 330 receives user profile information in a step 460 and determines whether to extend to the user an invitation to participate in the sampling pool based upon the user profile and the sampling rate. In a step 470, the invitation process 330 writes a cookie to the user's host machine 240. In a step 480 the user either accepts or declines the invitation. If the user accepts the invitation, then in a step 490 a survey is administered by a survey process 340 in the survey manager machine 250. Otherwise, the process ends.

The described system and method therefore create a sample pool for a web-based survey in which the overhead of creating the sample pool is centralized in the survey manager machine 250, thereby relieving host site webmasters of this burden. Furthermore, users are selectively and not repeatedly invited to participate in the sample pool.

Several embodiments are specifically illustrated and/or described herein. However, it will be appreciated that modifications and variations are covered by the above disclosure and within the purview of the appended claims without departing from the spirit and intended scope thereof.

What is claimed is:

1. A system for a client machine operated by a user, the system comprising:

a plurality of host machines for serving an HTML document;

a survey manager machine communicatively linked to each of the plurality of host machines, the survey manager configured to execute a sampling process and an invitation process, the sampling process operable to implement a sampling rate and the invitation process configured to receive user profile data and to transmit to the client machine an invitation for the user to participate in a web-based survey upon determining that transmission of the invitation is appropriate based upon the sampling rate and user profile data of the user;

and an executable tag embeddable in the HTML document, and operable to communicate with the survey manager machine to execute the sampling process and the invitation process when the client machine accesses the HTML document.

2. The system claimed in claim 1 wherein each of the host machines and the survey manager machine are connected to a communications network.

3. The system claimed in claim 1 wherein the process running on the survey manager machine further comprises a tag maintenance process operable to generate and maintain the executable tag.

4. The system claimed in claim 1 wherein a process running on each of the host machines is operable to copy the executable tag from the survey manager machine and embed the copied executable tag in the HTML document.

5. The system claimed in claim 1 wherein the process running on the survey manager machine further comprises a sampling process for setting a sampling rate and a user qualification process.

6. The system claimed in claim 5 wherein the process running on the survey manager machine further comprises an invitation process for receiving a user profile and extending an invitation to the user to participate in the sample pool based upon the sampling process and the user profile.

7. The system claimed in claim 1 wherein the process running on the survey manager machine further comprises a survey process for administering a survey to participating user.

8. A method for a client machine operated by a user, the method comprising:

providing a plurality of host machines for serving an HTML document;

providing a survey manager machine communicatively linked to each of the plurality of host machines, the survey manager configured to execute a sampling process and an invitation process, the sampling process operable to implement a sampling rate and the invitation process configured to receive user profile data and to transmit to the client machine an invitation for the user to participate in a web-based survey upon determining that transmission of the invitation is appropriate based upon the sampling rate and user profile data of the user; and providing a executable tag embedded in the HTML document, the executable tag being operable to communicate with a process running on the survey manager machine to execute the sampling process and the invitation process when the client machine accesses the HTML document.

9. The method claimed in claim 8 wherein each of the host machines and the survey manager machine are connected to a communications network.

10. The method claimed in claim 8 wherein the process running on the survey manager machine further comprises a tag maintenance process operable to generate and maintain the executable tags.

11. The method claimed in claim 8 wherein a process running on each of the host machines is operable to copy the executable tag from the survey manager machine and embed the copied executable tag in the HTML document.

12. The method claimed in claim 8 wherein the process running on the survey manager machine further comprises a sampling process for setting a sampling rate and a user qualification process.

13. The method claimed in claim 12 wherein the process running on the survey manager machine further comprises an invitation process for receiving a user profile and extending an invitation to the user to participate in the sample pool based upon the sampling process and the user profile.

14. The method claimed in claim 8 wherein the process running on the survey manager machine further comprises a survey process for administering a survey to a participating user.

15. For a client machine operated by a user, a computer-readable medium having computer-executable instructions for performing the step comprising:

enabling a survey manager machine communicatively linked to each of a plurality of host machines serving an HTML document to provide an executable tag embeddable in the HTML document, the survey manager configured to execute a sampling process and a invitation process, the sampling process operable to implement a sampling rate and the invitation process configured to receive user profile data and to transmit to the client machine an invitation for the user to participate in a web-based survey upon determining that transmission of the invitation is appropriate based upon the sampling rate and user profile data of the user; the executable tag operable to communicate with the survey manager machine to execute the sampling process and the invitation process when the client machine accesses the HTML document.

16. A for a client machine operated by a user, the system comprising:

a plurality of host machines for serving an HTML document;

a survey manager machine communicatively linked to each of the plurality of host machines, the survey manager configured to execute a sampling process and a invitation process, the sampling process operable to implement a sampling rate and the invitation process configured to receive user profile data and user prior use data and to transmit to the client machine an invitation for the user to participate in a web-based survey upon determining that transmission of the invitation is appropriate based upon the sampling rate and user profile data and prior use data of the user;

and an executable tag embeddable in the HTML document, and operable to communicate with a process running on the survey manager machine to execute the sampling process and the invitation process when the client machine accesses the HTML document.

17. The system of claim 16 wherein the survey manager machine is configured to receive cookie data stored on the client machine as prior use data.

18. The system of claim 16 wherein the survey manager machine is further configured to execute the invitation system to transmit a cookie to the client machine after the invitation for the user is transmitted to the client machine, the cookie containing identification information regarding the user.

* * * * *